United States Patent
Tassone et al.

(10) Patent No.: US 11,373,240 B2
(45) Date of Patent: *Jun. 28, 2022

(54) COMPUTER-IMPLEMENTED METHODS AND COMPUTER SYSTEMS FOR AN ELECTRONIC FINANCIAL PLATFORM

(71) Applicant: GREEN KEY TECHNOLOGIES, INC., Chicago, IL (US)

(72) Inventors: Anthony Tassone, Humacao, PR (US); Matt Martorello, Humacao, PR (US); Justin Martorello, Humacao, PR (US)

(73) Assignee: GREEN KEY TECHNOLOGIES, INC., London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/070,552

(22) Filed: Oct. 14, 2020

(65) Prior Publication Data

US 2021/0027378 A1    Jan. 28, 2021

Related U.S. Application Data

(63) Continuation of application No. 16/163,383, filed on Oct. 17, 2018, now Pat. No. 10,846,796, which is a continuation of application No. 15/621,509, filed on Jun. 13, 2017, now abandoned, which is a continuation of application No. 14/880,676, filed on Oct. 12, 2015, now abandoned, which is a continuation of application No. 14/478,081, filed on Sep. 5, 2014, now Pat. No. 9,159,104, which is a continuation of application No. 14/057,770, filed on Oct. 18, 2013, now abandoned, which is a continuation of application No. 13/942,423, filed on Jul. 15, 2013, now Pat. No. 8,577,790.

(Continued)

(51) Int. Cl.
*G06Q 40/04* (2012.01)

(52) U.S. Cl.
CPC ................................. *G06Q 40/04* (2013.01)

(58) Field of Classification Search
CPC ...................................................... G06Q 40/04
USPC ..................................................... 705/35–45
See application file for complete search history.

(56) References Cited

U.S. PATENT DOCUMENTS 8,577,790 B1    11/2013    Tassone et al.
9,159,104 B1    10/2015    Tassone et al.
(Continued)

*Primary Examiner* — Robert R Niquette
(74) *Attorney, Agent, or Firm* — FisherBroyles, LLP; Keats Quinalty

(57) ABSTRACT

In some embodiments, the instant invention provides for specifically programming a computer machine to perform at lease: receiving, from a trader, a passive indication of interest (IOI) for a financial instrument, where the passive IOI is a bid or an offer and a resting liquidity; classifying the trader as at least: a trading type that is subject to a decline ratio calculation for crossing the passive IOIs, where the decline ratio calculation identifies how many eligible aggressive IOIs have been previously declined by the trader out of a total number of all eligible aggressive IOIs that were offered to such trader; receiving, from another trader, another IOI that is an aggressive IOI, where the aggressive IOI is available to be immediately crossed at the price; and determining, in real-time, an allocation of the aggressive IOI to the trader submitted the passive IOI based on the decline ratio of the trader.

12 Claims, 4 Drawing Sheets

Related U.S. Application Data

(60) Provisional application No. 61/829,452, filed on May 31, 2013.

(56) References Cited

U.S. PATENT DOCUMENTS

| | | | |
|---|---|---|---|
| 10,846,796 B2 | 11/2020 | Tassone et al. | |
| 2006/0173771 A1* | 8/2006 | Johnston | G06Q 40/04 |
| | | | 705/37 |
| 2006/0184447 A1 | 8/2006 | Nieboer et al. | |
| 2007/0282732 A1 | 12/2007 | Schulman et al. | |
| 2011/0166982 A1* | 7/2011 | Cole | G06Q 40/06 |
| | | | 705/37 |
| 2012/0011055 A1 | 1/2012 | Fitzpatrick et al. | |
| 2012/0089502 A1 | 4/2012 | Dix et al. | |
| 2013/0006828 A1* | 1/2013 | Dale | G06Q 40/04 |
| | | | 705/37 |
| 2013/0013483 A1* | 1/2013 | Dale | G06Q 40/04 |
| | | | 705/37 |
| 2014/0324664 A1 | 10/2014 | Fitzpatrick et al. | |

* cited by examiner

14:30:01:324 trader1@gkm login successful 001 14:30:08:690 trader1@gkm S 10/0 N 13 CCS 654.25 P 001 14:30:08:690 trader1@gkm S 10/0 N 13 CCS 654.25 P

COMPUTER-IMPLEMENTED METHODS AND COMPUTER SYSTEMS FOR AN ELECTRONIC FINANCIAL PLATFORM

RELATED APPLICATIONS

This application is a continuation of U.S. patent application Ser. No. 16/163,383, filed Oct. 17, 2018, which is a continuation of U.S. patent application Ser. No. 15/621,509, filed Jun. 13, 2017, which is a continuation of U.S. patent application Ser. No. 14/880,676, filed Oct. 12, 2015, which is a continuation of U.S. patent application Ser. No. 14/478,081, filed Sep. 5, 2014, now U.S. Pat. No. 9,159,104, which is a continuation of U.S. patent application Ser. No. 14/057,770 filed Oct. 18, 2013, which is a continuation of U.S. patent application Ser. No. 13/942,423, filed Jul. 15, 2013, now U.S. Pat. No. 8,577,790, which claims the benefit of priority of U.S. Provisional Application No. 61/829,452, filed May 31, 2013, each of which is incorporated herein by reference in its entirety for all purposes.

TECHNICAL FIELD

In some embodiments, the instant inventions is related to computer-implemented methods and computer systems for an electronic financial platform for trading, such as, but is not limited to, trading of commodities, trading assets, trading financial instruments (stocks, bonds, swaps, ETFs, currencies, etc.), etc.

BACKGROUND

Typically, electronic trading venues, such as the New York Stock Exchange, regulate the order submission process for buying and selling securities. Typically, a trading venue can have its own set of rules, protocols, and processes that its participant/customer, such as a broker or a dealer, must follow to execute buy/sell orders via that trading venue. For instance, the exemplary trading venue may require to transform buy/sell orders to meet its specific rules, protocols, and processes of the trading venue prior to submitting those orders for execution.

SUMMARY OF THE INVENTION

In some embodiments, the instant invention provides for a computer-implemented method that includes at least the following steps of: specifically programming at least one computer machine to at least perform the following: receiving, from a first trader, a first indication of interest (IOI) for at least one first financial instrument at a first price; designating, in real-time, the first IOI as a first passive IOI; receiving, from a second trader, a second IOI for the at least one first financial instrument at a second price; designating, in real-time, the second IOI as a second passive IOI; receiving, from a third trader, a third IOI for the at least one first financial instrument at a third price; designating, in real-time, the third IOI as a third passive IOI: where each passive IOI is a bid or an offer associated with the at least one first financial instrument and a resting liquidity, where the resting liquidity is liquidity that does not cross upon submission, classifying the first trader, the second trader, and the third trader as at least the following trading types: i) a first trading type, where traders of the first trading type are subject to a decline ratio calculation for crossing their passive IOIs, where the decline ratio calculation identifies how many eligible aggressive IOIs have been previously declined by each trader of the first trading type out of a total number of all eligible aggressive IOIs that have been offered to such trader during a pre-determined time period, ii) a second trading type, where traders of the second trading type are subject to at least one pre-determined criterion for crossing their passive IOIs; calculating, for each trader of the first trading type, a decline ratio based on the decline ratio calculation; receiving, from a fourth trader, a fourth IOI for the at least one first financial instrument; designating, in real-time, the fourth IOI as an aggressive IOI, where the aggressive IOI is available to be immediately crossed at the first price, the second price, and the third price; determining, in real-time, from the group selected from the first passive IOI, the second passive IOI and the thin: passive IOI, an allocation of the aggressive IOI to: i) a plurality of traders of the first trading type based at least in part on the decline ratio of each trader from the plurality of traders of the first trading type, or ii) (a) the plurality of traders of the first trading type based at least in part on the decline ratio of each trader from the plurality of traders of the first trading type the at least one trader of the first trading type, and (b) at least one trader of the second trading type based at least in part on the at least one pre-determined criterion associated with the at least one trader of the second trading type; communicating notifications for at least a portion of the aggressive IOI based at least in part on the allocation; receiving, in response to the notifications, from each trader of the plurality of traders of the first trading type: (i) an acceptance response or (ii) a decline response; calculating, in real-time, when the acceptance response is received, a financial compensation to each trader from the plurality of traders of the first trading type who has accepted the at least portion of the aggressive IOI that has been offered to cross; re-calculating, in real-time when the decline response is received, based at least in part on the decline response, the decline ratio of each trader of the plurality of traders of the first trading type who has declined the at least portion of the aggressive IOI that has been offered to cross; and cancelling, in real-time, an uncrossed portion of the aggressive IOI.

In some embodiments, the first trading type is a professional trader and where the second trading type is a market maker.

In some embodiments, the trading types further include: iii) a third trading type, where passive IOIs from traders of the third trading type are subject to crossing based at least in part on a respective submission time for each passive IOI; and where the determining, in real-time, among the first passive IOI, the second passive IOI and the third passive IOI, the allocation of the aggressive IOI further includes: allocating, among the traders of the third trading type, based at least in part on the respective submission time of each respective passive IOIs.

In some embodiments, the at least one pre-determined criterion identifies a pre-determined portion of the aggressive IOI to be allocated to a market maker when a price of the market maker's passive IOI matches the aggressive IOI of the fourth trader.

In some embodiments, the first, the second, and the third prices are the same.

In some embodiments, the determining the allocation of the aggressive IOI further includes: ranking each trader of the first trading type in a priority allocation order based on the decline ratio of each trader from the plurality of traders of the first trading type; and allocating the aggressive IOI, in the priority allocation order, to fully satisfy a passive IOI of a higher ranked trader of the first trading type.

In some embodiments, the financial compensation is a rebate based on an accepted portion of the at least portion of the aggressive IOI that has been accepted to cross.

In some embodiments, the financial compensation is a price discount to a fourth price of the aggressive IOI.

In some embodiments, the determining the allocation of the aggressive IOI further includes: excluding, from the allocation, each trader of the first trading type whose decline ratio exceeds a pre-determined decline ratio value.

In some embodiments, the determining the allocation of the aggressive IOI further includes: calculating a premium above a fourth price of the aggressive IOI to be charged to each trader of the first trading type whose decline ratio exceeds a pre-determined decline ratio value, and allocating, at a fifth price, the aggressive IOI to each trader of the first trading type whose decline ratio exceeds the pre-determined decline ratio value, where the fifth price is a sum of the premium and the fourth price of the aggressive IOI.

In some embodiments, the notifications only reveal the best bid and the best offer out of all received IOIs.

In some embodiments, the decline response identifies that a particular trader of the first trading type has ignored a respective notification to cross.

In some embodiments, the decline response identifies that the particular trader of the first trading type has not acted upon the respective notification for over 10 seconds after the receipt.

In some embodiments, the determining the allocation of the aggressive IOI further includes: excluding, from the allocation, a passive IOI of each trader of the third trading type when passive IOIs from at least one market maker and the plurality of the professional traders have a combined liquidity to fully satisfy the aggressive IOI.

In some embodiments, the instant invention provides for a computer-implemented system that includes at least the following components/modules: at least one specialize computer machine, comprising: a non-transient memory having at least one region for storing particular computer executable program code; and at least one processor for executing the particular program code stored in the memory, where the particular program code is configured to at least perform the following operations: receiving, from a first trader, a first indication of interest (IOI) for at least one first financial instrument at a first price; designating, in real-time, the first IOI as a first passive IOI; receiving, from a second trader, a second IOI for the at least one first financial instrument at a second price; designating, in real-time, the second IOI as a second passive IOI; receiving, from a third trader, a third IOI for the at least one first financial instrument at a third price; designating, in real-time, the third IOI as a third passive IOI; where each passive IOI is a bid or an offer associated with the at least one first financial instrument and a resting liquidity, where the resting liquidity is liquidity that does not cross upon submission: classifying the first trader, the second trader, and the third trader as at least the following trading types: i) a first trading type, where traders of the first trading type are subject to a decline ratio calculation for crossing their passive IOIs, where the decline ratio calculation identifies how many eligible aggressive IOIs have been previously declined by each trader of the first trading type out of a total number of all eligible aggressive IOIs that have been offered to such trader during a pre-determined time period, ii) a second trading type, where traders of the second trading type are subject to at least one pre-determined criterion for crossing their passive IOIs; calculating, for each trader of the first trading type, a decline ratio based on the decline ratio calculation, receiving, from a fourth trader, a fourth IOI for the at least one first financial instrument; designating, in real-time, the fourth IOI as an aggressive IOI, where the aggressive IOI is available to be immediately crossed at the first price, the second price, and the third price; determining, in real-time, from the group selected from the first passive IOI, the second passive IOI and the third passive IOI, an allocation of the aggressive IOI to: i) a plurality of traders of the first trading type based at least in part on the decline ratio of each trader from the plurality of traders of the first trading type, or ii) (a) the plurality of traders of the first trading type based at least in part on the decline ratio of each trader from the plurality of traders of the first trading type the at least one trader of the first trading type, and (b) at least one trader of the second trading type based at least in part on the at least one pre-determined criterion associated with the at least one trader of the second trading type; communicating notifications for at least a portion of the aggressive IOI based at least in part on the allocation; receiving, in response to the notifications, from each trader of the plurality of traders of the first trading type: (i) an acceptance response or (ii) a decline response; calculating, in real-time, when the acceptance response is received, a financial compensation to each trader from the plurality of traders of the first trading type who has accepted the at least portion of the aggressive IOI that has been offered to cross; re-calculating, in real-time when the decline response is received, based at least in part on the decline response, the decline ratio of each trader of the plurality of traders of the first trading type who has declined the at least portion of the aggressive IOI that has been offered to cross; and cancelling, in real-time, an uncrossed portion of the aggressive IOI.

BRIEF DESCRIPTION OF THE DRAWINGS

The present invention will be further explained with reference to the attached figures. The figures constitute a part of this specification and include illustrative embodiments of the present invention and illustrate various objects and features thereof. Specific functional details disclosed herein are not to be interpreted as limiting, but merely as a representative basis for teaching one skilled in the art to variously employ the present invention. The figures shown are not necessarily to scale, with emphasis instead generally being placed upon illustrating the principles of the present invention. Further, some features may be exaggerated to show details of particular components. In addition, any measurements, specifications and the like shown in the figures are intended to be illustrative, and not restrictive.

DETAILED DESCRIPTION

Figure 1:
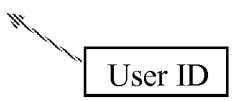
FIG. 1 illustrates an illustrative example in accordance with some embodiments of the present invention.

Among those benefits and improvements that have been disclosed, other objects and advantages of this invention will become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention which are intended to be illustrative, and not restrictive.

Throughout the specification and claims, the following terms take the meanings explicitly associated herein, unless the context clearly dictates otherwise. The phrases "In some embodiments" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, a "financial instrument" refers to a contract/interest representing equity ownership, debt or credit, typically in relation to a corporate or governmental entity, where the contract is typically saleable at one or more financial trading venues. Some examples of "financial instruments" can include, but are not limited to, stocks, bonds, commodities, swaps, futures, and currency traded on currency exchanges.

It is understood that at least one aspect/functionality of various embodiments described herein can be performed in real-time and dynamically. As used herein, the term "real-time" means that an event/action can occur instantaneously or almost instantaneously in time when another event/action has occurred. For example, in some embodiments, an event occurs in real-time if a time difference between a first time when a customer's order is received and a second time when a market maker's offer of a rebate or a fee is received is no more than 1 minute. In some embodiments, an event occurs in real-time if a time difference between a first time when a customer's order is received and a second time when a market maker's offer of a rebate or a fee is received is no more than 1 second. In some embodiments, the time difference between the customer's order and the market maker's rebate/fee offer is between less than 1 second and 1 minute.

As used herein, the term "dynamic(ly)" means that an event/action that can occur without any human intervention. The event/action may be in real-time and/or hourly, daily, weekly and/or monthly.

In some embodiments, the instant inventive platform operates an introducing broker and aggregator of liquidity in the "off-exchange" (e.g., outside of Chicago Mercantile Exchange) transactions related to futures and/or swaps. In some embodiments, the instant inventive platform can aggregates/receives quotes, also called "indications of interest" (IOI) by various means (e.g., telephone, smartphone, Internet, specialized computer interface, etc.).

In some embodiments, users of the instant inventive platform are traders, representing physical end users, commercial hedgers, and/or proprietary firms.

In some embodiments, the instant inventive platform facilitates crossing of IOIs (i.e., "crossed" indications) which occurs when a single quoted price satisfies both the buyer and seller and can thus be matched. In some embodiments, the instant inventive platform real-time and/or dynamically routes crossed indications to a central clearing house, to be matched and cleared.

In some embodiments, the instant inventive platform receives two types of IOIs, a passive IOI and an aggressive IOI:

i) a passive IOI is a resting liquidity that joins or improves the current quoted market but does not cross the opposing quoted price; and ii) an aggressive IOI is IOI that immediately crosses the quoted market and is an attempt to consume liquidity.

In some embodiments, when the aggressive IOI(s) is/re received by the instant inventive platform (the market place), opposing passive IOI provider(s) is/are electronically notified that their price(s) meet(s) another party's price and, if agreed upon, the instant inventive platform crosses the IOIs by submitting the deal to a central clearing house for matching and clearing.

In some embodiments, the instant inventive platform allows to remedy a situation when a trader who provides the passive IOIs retains the ability to decline the deal in the event an aggressive IOI appears and can be crossed—i.e., the trader with the passive IOIs probes markets with no-obligation quotes, thus deteriorating the quality of a pool of liquidity.

In some embodiments, the instant inventive platform monitors/tracks traders and determines individual scores/rankings based on each passive trader's willingness to honor their passive IOIs.

In some embodiments, the instant inventive platform determines and/or tracks trader's score(s), referred herein as "decline ratio(s)." In some embodiments, the decline ratio is determined as a number of declined deals divided by a number of trader's eligible deals. In some embodiments, the decline ratio is determined as the number of trader's eligible deals divide by the number of declined deals. In some embodiments, the decline ratio express as a percent of declined deals over trader's eligible deals.

In some embodiments, the decline ratio can be calculated on a periodic basis (hourly, daily, several days, weekly, monthly, yearly, etc.) In some embodiments, the decline ratio can be calculated as an average over several predetermined equal or unequal time periods. In some embodiments, the decline ratio can be adjusted on real-time basis.

In some embodiments, the decline ratio can be utilized as an input into a crossing algorithm for the following period. In some embodiments, the decline ratio can be utilized as an input into the crossing algorithm after the average value over several predetermined equal or unequal time periods has been calculated. In some embodiments, the decline ratio can be dynamically adjusted in the crossing algorithm as the decline ratio is adjusted on real-time basis.

In some embodiments, the crossing algorithm of the instant inventive platform allocates aggressive indications on a pro-rata basis. In some embodiments, traders with a lower decline ratio receive a higher proportion of crossing notifications than traders with a higher decline ratio.

In some embodiments, the crossing algorithm of the instant inventive platform allocates aggressive indications on a pro-rata basis so as to penalize traders who have more frequently decline trades and/or who decline trades exceeding a predetermined value and/or number of financial instruments (a number of shares). In some embodiments, the decline ratio monitoring/tracking incentivizes the passive IOI providers to stand firm on their quotes, thus keeping their "decline ratio" low (when the decline ratio is calculated as the number of declined deals divided by the number of trader's eligible deals) and their eligible allocation high.

In some embodiments, the passive IOI providers who decline less can be allowed to charge higher commissions than the passive IOI providers who decline more. In some embodiments, the passive IOI providers who decline less are given better execution pricing than the passive IOI providers who decline more.

In some embodiments, traders with a lower decline ratio (when the decline ratio is calculated as the number of declined deals divided by the number of trader's eligible deals) receive a higher proportion of crossing notifications than traders with a higher decline ratio.

In some embodiments, the distribution of crossing notifications is adjusted based on a suitable formula used to calculate the decline ratio.

In some embodiments, the instant inventive platform can be a hybrid implementation having both voice and electronic quoting capabilities. In some embodiments, the instant inventive platform does not display/reveal quantity, volume and/or last traded price information to any market participant. In some embodiments, the instant inventive platform only reveals to all participants the best bid and the best offer.

In some embodiments, the instant inventive platform accepts same day limit orders only. In some embodiments, the instant inventive platform allows for partials. In some embodiments, the instant inventive platform does not allow other order types.

In some embodiments, the instant inventive platform operates by allowing a trader to electronically and anonymously place an IOI in a particular financial instrument (e.g., commodity). In some embodiments, the IOIs that do not cross the opposing side of the market are designated as "passive IOIs" and are kept in the indications book (e.g., electronic record keeping faculty of the instant inventive platform). In some embodiments, the IOIs that are immediately opposed to or cross the resting liquidity are designated as "aggressive IOIs."

In some embodiments, a trader submits an IOI in an indication ticket. In some embodiments, depending on a price selected, the trader's IOI can be automatically/real-time designated as passive or aggressive IOI. In some embodiments, the trader does not determine the type of IOI beyond selecting a price; consequently, there is not resting aggressive IOIs in the indications book.

For example, in some embodiments, in the event a passive IOI becomes eligible for crossing, which is determined by the crossing algorithm of the instant inventive platform, the passive trader is sent a pop-up notification that alerts the trader to the aggressive, crossing IOI. The trader that submitted the aggressive IOI is committed for price and size, and awaits the result.

In some embodiments, the pop-up notification identifies that an opposing trader wishes to cross as the indicated price and a decision to accept or not needs to be made in the next 10 seconds. The passive trader now has the ability to: accept, decline or ignore the deal (e.g., allow time to expire). In some embodiments, ignoring a deal is equivalent to declining the deal.

In some embodiments, the pop-up notification identifies that the decision to accept or not needs to be made in the next 5 seconds. In some embodiments, the pop-up notification identifies that the decision to accept or not needs to be made in the next 3 seconds. In some embodiments, the pop-up notification identifies that the decision to accept or not needs to be made in the next 2 seconds. In some embodiments, the pop-up notification identifies that an opposing trader wishes to cross as the indicated price and a decision to accept or not needs to be made in a time period between 5 seconds and 30 seconds. In some embodiments, the pop-up notification identifies that an opposing trader wishes to cross as the indicated price and a decision to accept or not needs to be made in a time period between 5 seconds and 60 seconds.

In some embodiments, the passive trader who has received the notification is committed to the price and a full quantity originally indicated in the trader's passive IOI. In some embodiments, neither trader knows the other's total quantity, just what they themselves are willing to do at that price. In some embodiments, the cross would occur for a minimum of the two quantities provided. Therefore, in some embodiments, no trader can execute more than the traders have identified in their IOIs.

In some embodiments, in the event the aggressive quantity is less than the passive quantity, the remaining passive quantity would stay in the book of the instant inventive platform. In some embodiments, in the event the aggressive quantity is greater than the passive quantity, the remaining (uncrossed) aggressive quantity is canceled, since the aggressive quantity/price cannot rest in the book.

In some embodiments, only the parties involved in the cross are aware that the cross took place. In some embodiments, in the event the IOIs are crossed, the details of those indications are then electronically routed to the central clearing house for matching and clearing. In some embodiments, upon acceptance, the status of the IOI in the trader's workspace (e.g., electronic display of an electronic device (e.g., terminal, smartphone, PDA, laptop, computer, etc.) changes from a pending clearing status to the cleared status (i.e., the visual alert). In some embodiments, the trader receives a textual alert (e.g., SMS message, e-mail, screen message, etc.) about the change in the status. In some embodiments, the trader receives an audio alert (e.g., a voice message).

In some embodiments, in the event that the passive IOI provider declines (or ignores) the deal, the trader's passive IOI is canceled and removed from the indication book, and the aggressive IOI is then routed to a next eligible passive IOI provider. In some embodiments, in the event that no other passive liquidity exists, the inventive platform sends to the aggressive IOI provider a notification (e.g., textual, visual, audio, or some combination thereof) that the deal has been declined and updated as to whether any partial crossing has occurred. In some embodiments, any remaining aggressive liquidity is removed.

In some embodiments, the decline ratio is a screening/filtering factor in determining a trader's "eligible allocation" of aggressive IOIs.

In some embodiments, the decline ratios are not shown to traders/users. In some embodiments, traders/users are only shown their own respective decline ratios. In some embodiments, traders/users are only shown their own respective decline ratios and the decline ratios of theirs current counterparties. In some embodiments, traders/users are shown the decline ratios of all other traders/users. In some embodiments, the decline ratio of a particular trader/user can be anonymously viewed by others without disclosing the identity of the particular trader/user and/or identities of others who has viewed the particular trader/user's decline ratio.

Some Illustrative Examples

In some embodiments, the instant inventive platform maintains an indication log for each user that tracks the user's activity, including the user's decline ratio. For example, as shown in FIG. 1, the instant inventive platform can assign to each user (an individual or a company) a unique "User ID".

Figure 2:
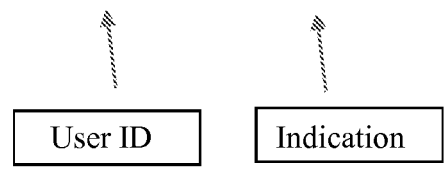
FIG. 2 illustrates another illustrative example in accordance with some embodiments of the present invention.

In some embodiments, as shown in FIG. 2, the User ID can be utilized to log onto the inventive platform and can be referenced in each IOI that the user electronically submits.

Figure 3:
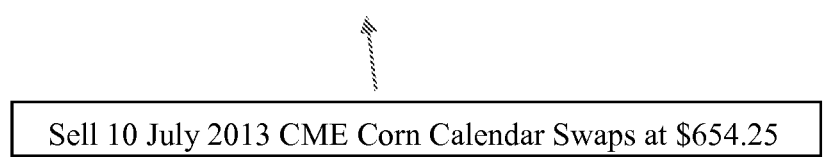
FIG. 3 illustrates yet another illustrative example in accordance with some embodiments of the present invention.

In some embodiments, as shown in FIG. 3, an IOI can contain market data such as the quantity and price that the user is willing to buy or sell at.

Figure 4:
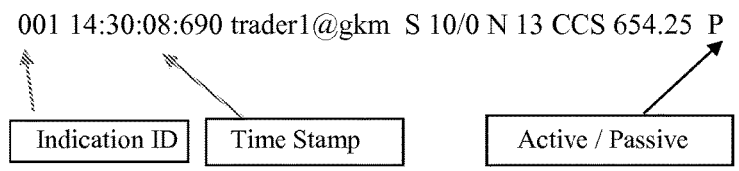
FIG. 4 illustrates yet another illustrative example in accordance with some embodiments of the present invention.

In some embodiments, as shown in FIG. 4, the inventive platform can assign each IOI an ID, label as passive (P) or aggressive (A), timestamp to, for example, the nearest millisecond, and/or log into a database.

Figure 5:
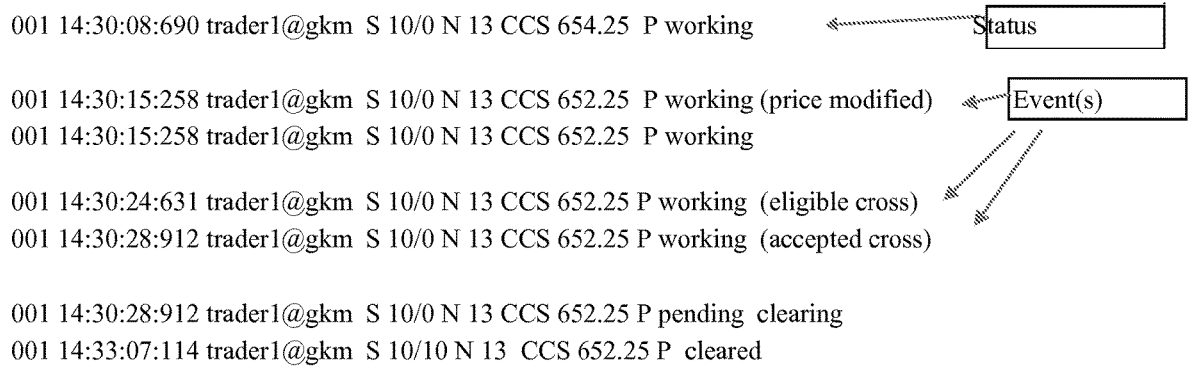
FIG. 5 illustrates yet another illustrative example in accordance with some embodiments of the present invention.

In some embodiments, as shown in FIG. 5, the inventive platform can maintain, in the indication log, the event history and/or status of that indication ID, including whether the price and/or quantity was modified, cancelled, eligible to be crossed against, accepted, declined and/or cleared.

In some embodiments, the historical database of logs, on a per user basis, can be utilized by the instant inventive platform, to calculate and/or track the decline ratio: for example (when the decline ratio is calculated as the number of declined deals divided by the number of trader's eligible deals), for each user, identifying each passive indication that became eligible for crossing for that user and dividing the user's total number of accepted crosses by a number of the identified eligible passive indications related to the user's passive IOI(s).

In some embodiments, the instant inventive platform utilizes the user's decline ratio in the inventive pro-rata crossing algorithm. In some embodiments, the inventive crossing algorithm allocates aggressive indications on a pro-rata basis. For example, traders/users with the lowest decline ratio (when the decline ratio is calculated as the number of declined deals divided by the number of trader's eligible deals) receive a higher proportion of crossing notifications than traders with a higher decline ratio.

In some embodiments, the inventive pro-rata crossing algorithm of the inventive platform can utilize as inputs at least one or more of the following factors to determine where to route an aggressive allocation.

In some embodiments, the inventive pro-rata crossing algorithm of the inventive platform can utilize a "classification" of a passive indication (IOI) provider. For example, the inventive platform can classify its users as a market maker, a professional customer, or a customer.

In some embodiments, the market maker(s) is a company or an individual that quotes both a buy and/or a sell price in a financial instrument or commodity held in inventory, with the intention to make a profit on the bid-offer spread, or turn. In some embodiments, the professional customer is a company or an individual that places buy or sell numerous and/or large volume orders on some consistent basis. In some embodiments, the customer is a company or an individual that trades infrequently and/or relatively small orders.

In some embodiments, the inventive pro-rata crossing algorithm of the inventive platform, for example, awards market makers a fixed allocation amount depending on at least one pre-determined criteria, such as conditions of the user agreement with the inventive platform. For instance, a market maker can be required to meet certain trading volumes on aperiodic basis (e.g., daily, monthly, annually) for the market maker to qualify to keep their status of market maker.

In some embodiments, the inventive pro-rata crossing algorithm of the inventive platform, for example, awards professional customers in order of their decline ratio ranking among other professional customers. In some embodiments, when the decline ratio is calculated as the number of declined deals divided by the number of trader's eligible deals, new professional customers start with the highest possible decline ratio (lowest ranking) and need to earn a lower decline ratio (higher ranking) in order to begin receiving regular notifications of aggressive IOIs.

In some embodiments, customers are not entitled to allocation, unless there are no market makers or professional customers also available to cross with a particular aggressive IOI. In some embodiments, in the case other customers' passive IOIs are also present at the same price, the inventive pro-rata crossing algorithm of the inventive platform awards allocations based on a time priority.

Tables 1 and 2 illustrate an example of an allocation of an aggressive IOI. For example, as shown in Table 1, the market for corn is 6.25 bid, with a total quantity of 185 on that bid. The 185 quantity is broken up among 12 different types of users: 3 market makers, 6 professional customers and 3 customers.

TABLE 1

|  | BID QTY | BID PRICE |
|---|---|---|
| TOP OF BOOK | 185 | 6.25 |
| Market Maker 1 | 10 | 6.25 |
| Market Maker 2 | 10 | 6.25 |
| Market Maker 3 | 10 | 6.25 |
| Professional Customer 1 | 15 | 6.25 |
| Professional Customer 2 | 25 | 6.25 |
| Professional Customer 3 | 10 | 6.25 |
| Professional Customer 4 | 25 | 6.25 |
| Professional Customer 5 | 5 | 6.25 |
| Professional Customer 6 | 10 | 6.25 |
| Customer 1 | 20 | 6.25 |
| Customer 2 | 30 | 6.25 |
| Customer 3 | 15 | 6.25 |

For example, an aggressive IOI arrives into the market to sell a qty of 50 at the bid price of 6.25. In one example, the inventive pro-rata crossing algorithm of the inventive platform displays/transmits the aggressive IOI in the form of a notification to: (1) any market makers on that price and (2) the professional customers in order of their decline ratio ranking.

TABLE 2

|  | Bid Qty | Bid Price | Fixed Allocation | Decline Ratio | Decline Ratio Rank | Allocation |
|---|---|---|---|---|---|---|
| TOP OF BOOK | 185 | 6.25 |  |  |  |  |
| Market Maker 1 | 10 | 6.25 | 7% (min of 5) |  |  | 5 |
| Market Maker 2 | 10 | 6.25 | 7% (min of 5) |  |  | 5 |
| Market Maker 3 | 10 | 6.25 | 7% |  |  | 5 |

TABLE 2-continued

|  | Bid Qty | Bid Price | Fixed Allocation (min of 5) | Decline Ratio | Decline Ratio Rank | Allocation |
|---|---|---|---|---|---|---|
| Professional Customer 1 | 15 | 6.25 |  | 0.250 | 5 | 0 |
| Professional Customer 2 | 25 | 6.25 |  | 0.350 | 6 | 0 |
| Professional Customer 3 | 10 | 6.25 |  | 0.100 | 2 | 10 |
| Professional Customer 4 | 25 | 6.25 |  | 0.150 | 3 | 20 |
| Professional Customer 5 | 5 | 6.25 |  | 0.050 | 1 | 5 |
| Professional Customer 6 | 10 | 6.25 |  | 0.200 | 4 | 0 |
| Customer 1 | 20 | 6.25 |  |  |  | 0 |
| Customer 2 | 30 | 6.25 |  |  |  | 0 |
| Customer 3 | 15 | 6.25 |  |  |  | 0 |

As Table 2 illustrates, the inventive pro-rata crossing algorithm of the inventive platform awards all 3 markets makers a notification to cross a quantity of 5 (the predetermined quantity based on the user agreement). As Table 2 illustrates, the inventive pro-rata crossing algorithm of the inventive platform awards professional customers 3 (the decline ratio rank of 2) and 5 (the decline ratio rank of 1) a notification to cross their full quantity. As Table 2 illustrates, the inventive pro-rata crossing algorithm of the inventive platform further awards professional customer 4 (the decline ratio rank of 3) a notification to cross 20 or their 25 quantity. As Table 2 illustrates, no other participants receive notifications from the inventive platform and are unaware that any crossing is occurring.

In some embodiments, in the event that any user declines an allocation, that allocation would be distributed to the next eligible participant (i.e., the next ranking professional customer or customer) as determined by the pro-rata crossing algorithm of the instant inventive platform.

In some embodiments, the instant inventive platform transmits/displays to the aggressive IOI provider updates during this process making them aware of the total quantity crossed. In some embodiments, if there is any remaining (uncrossed) aggressive indication quantity left, the leftover balance is canceled and removed from the instant inventive platform/system.

In some embodiments, the instant inventive platform transmits real-time or in batch eligible crossing(s) that has(have) occurred to the central clearing facility.

Illustrative Operating Environments for Some Embodiments

Figure 6:
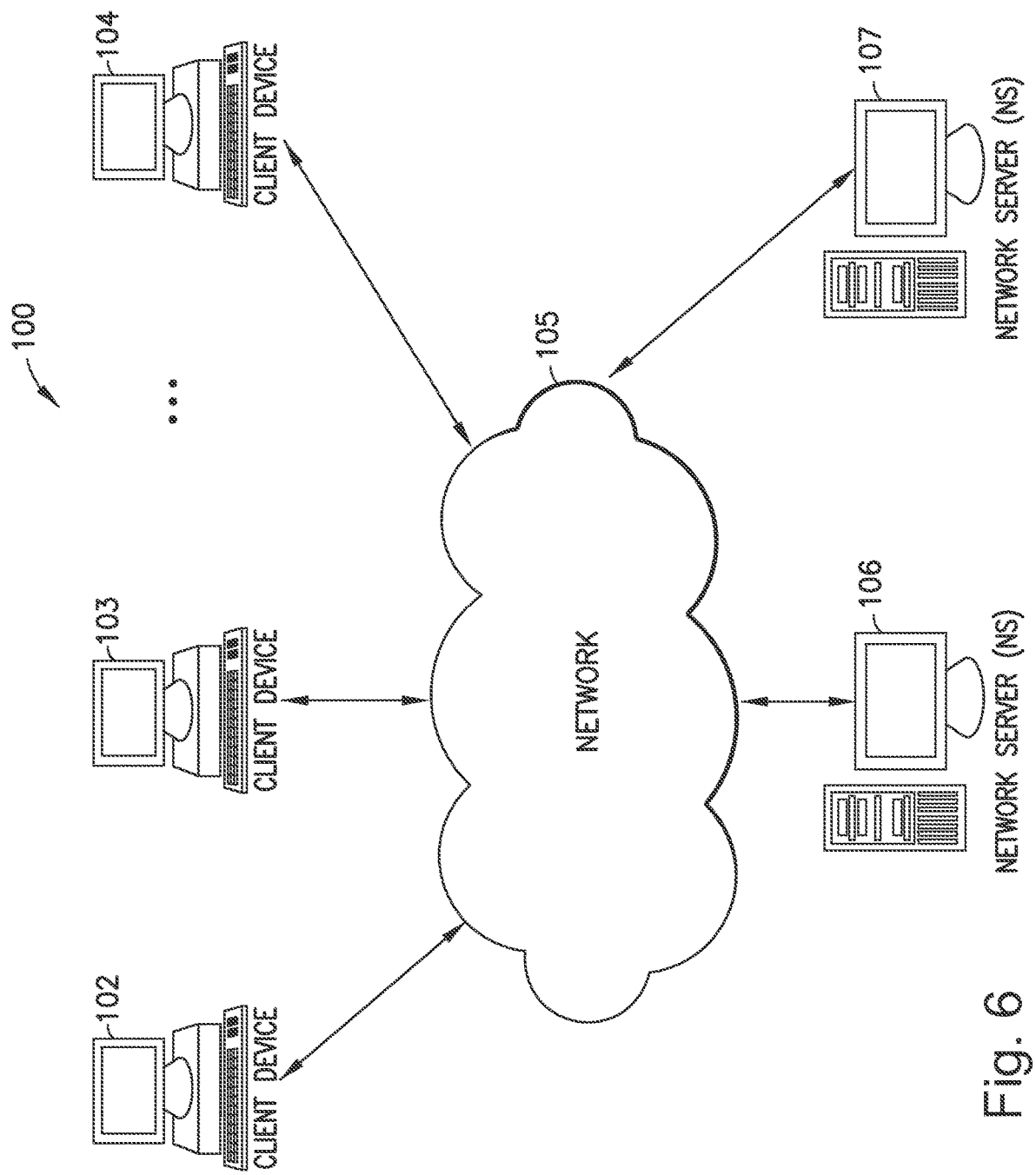
FIG. 6 illustrates a computer system in accordance with some embodiments of the present invention.

FIG. 6 illustrates a computer system in accordance with some embodiments of the present invention. However, not all of these components may be required to practice the invention, and variations in the arrangement and type of the components may be made without departing from the spirit or scope of the invention. In some embodiment, the inventive platform hosts a large number of members and concurrent transactions. In other embodiments, the inventive exchange computer system is based on a scalable computer and network architecture that incorporates varies strategies for assessing the data, caching, searching, and database connection pooling. An example of the scalable architecture is an architecture that is capable of operating multiple servers. In embodiments, the computing system in accordance with the instant invention may include, but not limiting to, one or more programmed computers, systems employing distributed networking, or other type of system that might be used to transmit and process electronic data.

In embodiments, client devices (e.g., computers, mobile device, etc.) 102-104 of market makers and customers (professional and other customers) include virtually any computing device capable of receiving and sending a message over a network, such as network 105, to and from another computing device, such as servers (e.g., the inventive exchange) 106 and 107, each other, and the like.

In some embodiments, the set of such devices includes devices that typically connect using a wired communications medium such as personal computers, multiprocessor systems, microprocessor-based or programmable consumer electronics, network PCs, and the like. In embodiments, the set of such devices also includes devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. Similarly, in embodiments, client devices 102-104 are any device that is capable of connecting using a wired or wireless communication medium such as a PDA, POCKET PC, wearable computer, and any other device that is equipped to communicate over a wired and/or wireless communication medium.

In embodiments, client devices 102-104 are further configured to receive a message from the another computing device employing another mechanism, including, but not limited to email, Short Message Service (SMS), Multimedia Message Service (MMS), instant messaging (IM), internet relay chat (IRC), mIRC, Jabber, and the like.

In embodiments, network 105 is configured to couple one computing device to another computing device to enable them to communicate. In embodiments, network 105 is enabled to employ any form of computer readable media for communicating information from one electronic device to another. Also, in embodiments, network 105 includes a wireless interface, and/or a wired interface, such as the Internet, in addition to local area networks (LANs), wide area networks (WANs), direct connections, such as through a universal serial bus (USB) port, other forms of computer-readable media, or any combination thereof. In embodiments, on an interconnected set of LANs, including those based on differing architectures and protocols, a router acts as a link between LANs, enabling messages to be sent from one to another.

Also, in some embodiments, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, in embodiments, remote computers and other related electronic devices could be remotely connected to either LANs or WANs via a modem and temporary telephone link. In essence, in embodiments, network 105 includes any communication method by which information may travel between client devices 102-104, and servers 106 and 107.

Figure 7:
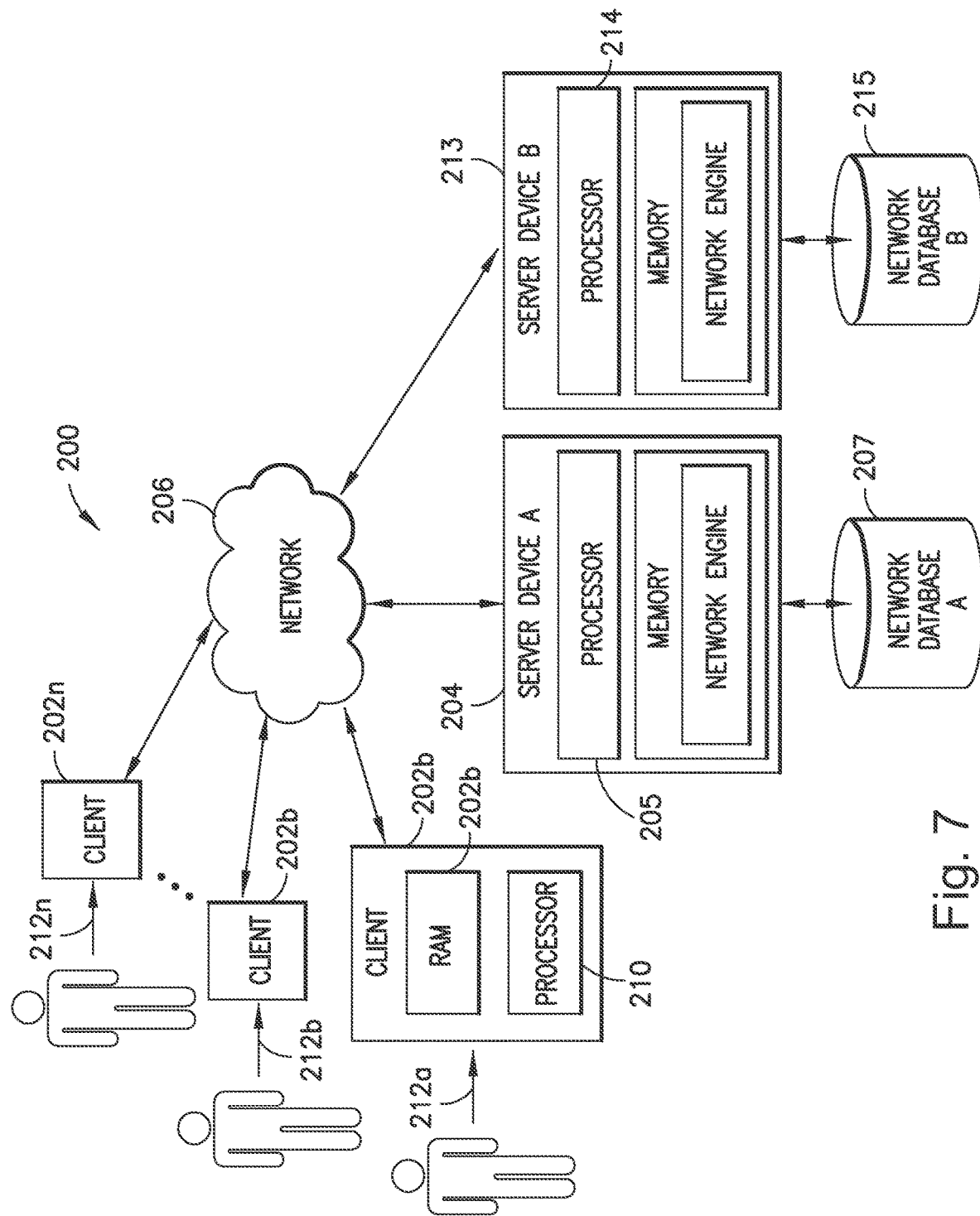
FIG. 7 illustrates a computer system in accordance with another embodiments of the present invention.

FIG. 7 shows another exemplary embodiment of the exchange computer and network architecture that supports the inventive computer platform in accordance with some embodiments of the instant invention. In some embodiments, the client devices of maker makers and customers 202a, 202b thru 202n (e.g., computers, mobile device, smart routers, etc.) shown each comprises a computer-readable medium, such as a random access memory (RAM) 208 coupled to a processor 210. In some embodiments, the processor 210 executes computer-executable program instructions stored in memory 208. Such processors comprise a microprocessor, an ASIC, and state machines. Such processors comprise, or are be in communication with, media, for example computer-readable media, which stores instructions that, when executed by the processor, cause the processor to perform the steps described herein.

Some embodiments of computer-readable media include, but are not limited to, an electronic, optical, magnetic, or other storage or transmission device capable of providing a processor, such as the processor 210 of client 202a, with computer-readable instructions.

In some embodiments, other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media transmit or carry instructions to a computer, including a router, private or public network, or other transmission device or channel, both wired and wireless. The instructions comprise code from any computer-programming language, including, for example, C, C++, C#, Visual Basic, Java, Python, Perl, and JavaScript.

In some embodiments, the client devices 202a-n also include a number of external or internal devices such as a mouse, a CD-ROM, DVD, a keyboard, a display, or other input or output devices. In some embodiments, examples of client devices 202a-n are personal computers, digital assistants, personal digital assistants, cellular phones, mobile phones, smart phones, pagers, digital tablets, laptop computers, Internet appliances, and other processor-based devices. In general, a client device 202a is any type of processor-based platform that is connected to a network 206 and that interacts with one or more application programs. Client devices 202a-n operate on any operating system capable of supporting a browser or browser-enabled application, such as Microsoft™, Windows™, or Linux. The client devices 202a-n shown include, for example, personal computers executing a browser application program such as Microsoft Corporation's Internet Explorer™, Apple Computer, Inc.'s Safari™, Mozilla Firefox, and Opera.

In some embodiments, through the client devices 202a-n, users/investors 212a-n can communicate over the network 206 with the inventive exchange of the instant invention, each other and with other systems and devices coupled to the network 206. As shown in FIG. 2, server devices 204 and 213 (e.g., for the inventive exchange) are also coupled to the network 206.

Of note, the embodiments described herein may, of course, be implemented using any appropriate computer system hardware and/or computer system software. In this regard, those of ordinary skill in the art are well versed in the type of computer hardware that may be used (e.g., a mainframe, a mini-computer, a personal computer ("PC"), a network (e.g., an intranet and/or the internet)), the type of computer programming techniques that may be used (e.g., object oriented programming), and the type of computer programming languages that may be used (e.g., C++, Basic, AJAX, Javascript). The aforementioned examples are, of course, illustrative and not restrictive.

In some embodiments, the instant invention provides for a computer-implemented method that includes at least the following steps of: specifically programming at least one computer machine to at least perform the following: receiving, from a first trader, a first indication of interest (IOI) for at least one first financial instrument at a first price; designating, in real-time, the first IOI as a first passive IOI; receiving, from a second trader, a second IOI for the at least one first financial instrument at a second price; designating, in real-time, the second IOI as a second passive IOI receiving, from a third trader, a third IOI for the at least one first financial instrument at a third price; designating, in real-time, the third IOI as a third passive IOI; where each passive IOI is a bid or an offer associated with the at least one first financial instrument and a resting liquidity, where the resting liquidity is liquidity that does not cross upon submission; classifying the first trader, the second trader, and the third trader as at least the following trading types: i) a first trading type, where traders of the first trading type are subject to a decline ratio calculation for crossing their passive IOIs, where the decline ratio calculation identifies how many eligible aggressive IOIs have been previously declined by each trader of the first trading type out of a total number of all eligible aggressive IOIs that have been offered to such trader during a pre-determined time period, ii) a second trading type, where traders of the second trading type are subject to at least one pre-determined criterion for crossing their passive IOIs; calculating, for each trader of the first trading type, a decline ratio based on the decline ratio calculation, receiving, from a fourth trader, a fourth IOI for the at least one first financial instrument; designating, in real-time, the fourth IOI as an aggressive IOI, where the aggressive IOI is available to be immediately crossed at the first price, the second price, and the third price; determining, in real-time, from the group selected from the first passive IOI, the second passive IOI and the third passive IOI, an allocation of the aggressive IOI to: i) a plurality of traders of the first trading type based at least in part on the decline ratio of each trader from the plurality of traders of the first trading type, or ii) (a) the plurality of traders of the first trading type based at least in part on the decline ratio of each trader from the plurality of traders of the first trading type the at least one trader of the first trading type, and (b) at least one trader of the second trading type based at least in part on the at least one pre-determined criterion associated with the at least one trader of the second trading type; communicating notifications for at least a portion of the aggressive IOI based at least in part on the allocation; receiving, in response to the notifications, from each trader of the plurality of traders of the first trading type: (i) an acceptance response or (ii) a decline response; calculating, in real-time, when the acceptance response is received, a financial compensation to each trader from the plurality of traders of the first trading type who has accepted the at least portion of the aggressive IOI that has been offered to cross; re-calculating, in real-time, when the decline response is received, based at least in part on the decline response, the decline ratio of each trader of the plurality of traders of the first trading type who has declined the at least portion of the aggressive IOI that has been offered to cross; and cancelling, in real-time, an uncrossed portion of the aggressive IOI.

In some embodiments, the first trading type is a professional trader and where the second trading type is a market maker.

In some embodiments, the trading types further include: iii) a third trading type, where passive IOIs from traders of the third trading type are subject to crossing based at least in part on a respective submission time for each passive IOI; and where the determining, in real-time, among the first passive IOI, the second passive IOI and the third passive IOI, the allocation of the aggressive IOI further includes: allocating, among the traders of the third trading type, based at least in part on the respective submission time of each respective passive IOIs.

In some embodiments, the at least one pre-determined criterion identifies a pre-determined portion of the aggressive IOI to be allocated to a market maker when a price of the market maker's passive IOI matches the aggressive IOI of the fourth trader.

In some embodiments, the first, the second, and the third prices are the same.

In some embodiments, the determining the allocation of the aggressive IOI further includes: ranking each trader of the first trading type in a priority allocation order based on the decline ratio of each trader from the plurality of traders of the first trading type; and allocating the aggressive IOI, in the priority allocation order, to fully satisfy a passive IOI of a higher ranked trader of the first trading type.

In some embodiments, the financial compensation is a rebate based on an accepted portion of the at least portion of the aggressive IOI that has been accepted to cross.

In some embodiments, the financial compensation is a price discount to a fourth price of the aggressive IOI.

In some embodiments, the determining the allocation of the aggressive IOI further includes: excluding, from the allocation, each trader of the first trading type whose decline ratio exceeds a pre-determined decline ratio value.

In some embodiments, the determining the allocation of the aggressive IOI further includes: calculating a premium above a fourth price of the aggressive IOI to be charged to each trader of the first trading type whose decline ratio exceeds a pre-determined decline ratio value, and allocating, at a fifth price, the aggressive IOI to each trader of the first trading type whose decline ratio exceeds the pre-determined decline ratio value, where the fifth price is a sum of the premium and the fourth price of the aggressive IOI.

In some embodiments, the notifications only reveal the best bid and the best offer out of all received IOIs.

In some embodiments, the decline response identifies that a particular trader of the first trading type has ignored a respective notification to cross.

In some embodiments, the decline response identifies that the particular trader of the first trading type has not acted upon the respective notification for over 10 seconds after the receipt.

In some embodiments, the determining the allocation of the aggressive IOI further includes: excluding, from the allocation, a passive IOI of each trader of the third trading type when passive IOIs from at least one market maker and the plurality of the professional traders have a combined liquidity to fully satisfy the aggressive IOI.

In some embodiments, the instant invention provides for a computer-implemented system that includes at least the following components/modules: at least one specialize computer machine, comprising: a non-transient memory having at least one region for storing particular computer executable program code; and at least one processor for executing the particular program code stored in the memory, where the particular program code is configured to at least perform the following operations: receiving, from a first trader, a first indication of interest (IOI) for at least one first financial instrument at a first price; designating, in real-time, the first IOI as a first passive IOI; receiving, from a second trader, a second IOI for the at least one first financial instrument at a second price; designating, in real-time, the second IOI as a second passive IOI; receiving, from a third trader, a third IOI for the at least one first financial instrument at a third price: designating, in real-time, the third IOI as a third passive IOI: where each passive IOI is a bid or an offer associated with the at least one first financial instrument and a resting liquidity, where the resting liquidity is liquidity that does not cross upon submission: classifying the first trader, the second trader, and the third trader as at least the following trading types: i) a first trading type, where traders of the first trading type are subject to a decline ratio calculation for crossing their passive IOIs, where the decline ratio calculation identifies how many eligible aggressive IOIs have been previously declined by each trader of the first trading type out of a total number of all eligible aggressive IOIs that have been offered to such trader during a pre-determined time period, ii) a second trading type, where traders of the second trading type are subject to at least one pre-determined criterion for crossing their passive IOIs; calculating, for each trader of the first trading type, a decline ratio based on the decline ratio calculation, receiving, from a fourth trader, a fourth IOI for the at least one first financial instrument; designating, in real-time, the fourth IOI as an aggressive IOI, where the aggressive IOI is available to be immediately crossed at the first price, the second price, and the third price; determining, in real-time, from the group selected from the first passive IOI, the second passive IOI and the third passive IOI, an allocation of the aggressive IOI to: i) a plurality of traders of the first trading type based at least in part on the decline ratio of each trader from the plurality of traders of the first trading type, or ii) (a) the plurality of traders of the first trading type based at least in part on the decline ratio of each trader from the plurality of traders of the first trading type the at least one trader of the first trading type, and (b) at least one trader of the second trading type based at least in part on the at least one pre-determined criterion associated with the at least one trader of the second trading type: communicating notifications for at least a portion of the aggressive IOI based at least in part on the allocation; receiving, in response to the notifications, from each trader of the plurality of traders of the first trading type: (i) an acceptance response or (ii) a decline response; calculating, in real-time, when the acceptance response is received, a financial compensation to each trader from the plurality of traders of the first trading type who has accepted the at least portion of the aggressive IOI that has been offered to cross; re-calculating, in real-time when the decline response is received, based at least in part on the decline response, the decline ratio of each trader of the plurality of traders of the first trading type who has declined the at least portion of the aggressive IOI that has been offered to cross; and cancelling, in real-time, an uncrossed portion of the aggressive IOI.

While a number of embodiments of the present invention have been described, it is understood that these embodiments are illustrative only, and not restrictive, and that many modifications may become apparent to those of ordinary skill in the art. Further still, the various steps may be carried out in any desired order (and any desired steps may be added and/or any desired steps may be eliminated).

What is claimed is:

1. A non-transitory computer readable medium comprising instructions that, when executed by a processor in a first computing device of a plurality of computing devices, direct the processor to:

electronically receive, by the at least one improved matching computer system, over a computer network, from a first trading computer system of a first trading entity, at least one of a first indication of interest (IOI) or a first limit order, for at least one first financial instrument at a first price;

automatically designate, by the at least one improved matching computer system, in real-time, the first IOI as a first passive IOI;

electronically receive, by the at least one improved matching computer system, over the computer network, from a second trading computer system of a second trading entity, at least one of a second IOI or a second limit order, for the at least one first financial instrument at a second price;

automatically designate, by the at least one improved matching computer system, in real-time, the second IOI as a second passive IOI;

wherein the first passive IOI and the second passive IOI is a bid or an offer associated with the at least one first financial instrument and is a resting liquidity, wherein the resting liquidity is an order that does not cross upon immediate submission;

wherein the first limit order and the second limit order are not immediately executable;

calculate, by at least one improved matching computer system, for each of the first trading entity and the second trading entity, a decline ratio based on a decline ratio calculation, wherein the decline ratio calculation identifies at least one of:
  i) a first ratio of eligible aggressive IOIs that have been previously declined or cancelled by each trading entity to a total number of all eligible aggressive IOIs that have been associated with such trading entity during a first pre-determined time period,
  ii) a second ratio of orders that have been previously declined or cancelled by each trading entity to a total number of orders that have been associated with such trading entity during a second pre-determined time period,
  iii) a third ratio of eligible aggressive IOIs that have been previously declined or cancelled by each trading entity to a total number of accepted eligible aggressive IOIs that have been associated with such trading entity during a third pre-determined time period,
  iv) a fourth ratio of orders that have been previously declined or cancelled by each trading entity to a total number of executed orders that have been associated with such trading entity during a fourth pre-determined time period, or
  v) any combination thereof;

electronically receive, by the at least one improved matching computer system, over the computer network, from a third trading computer system of a third trading entity, at least one of a third IOI or a third limit order for the at least one first financial instrument;

automatically designate, by the at least one improved matching computer system, in real-time, the third IOI as an aggressive IOI, wherein the aggressive IOI is available to be immediately crossed at the first price, the second price, and the third price;

wherein the third limit order is immediately executable;

automatically determine, by the at least one improved matching computer system, in real-time, from the first passive IOI or the second passive IOI, a first allocation of the aggressive IOI to each respective passive IOI based at least in part on the decline ratio of each respective trading entity of the first trading entity and the second trading entity;

electronically and concurrently communicate, by the at least one improved matching computer system, over the computer network, at least one first notification for at least a portion of the aggressive IOI based at least in part on the first allocation to the first trading computer system of the first trading entity and the second trading computer system of the second trading entity;

electronically receive, by the at least one improved matching computer system, over the computer network, in response to the at least one first notification, from respective trading computer system of each trading entity to whom the at least one first notification has been communicated:
  i) an acceptance response or
  ii) a decline response;

automatically calculate, by the at least one improved matching computer system, in real-time, when the acceptance response is received, a first financial compensation to each trading entity who has accepted the at least portion of the aggressive IOI that has been offered to cross;

automatically re-calculate, in real-time, when the decline response is received, based at least in part on the decline response, by the at least one improved matching computer system, the decline ratio of each trading entity who has accepted or declined the at least portion of the aggressive IOI that has been offered to cross;

automatically cancel, by the at least one improved matching computer system, in real-time, an uncrossed portion of the aggressive IOI;

automatically determine, by the at least one improved matching computer system, in real-time, from the first limit order or the second limit order, a second allocation of the third limit order based at least in part on the decline ratio of each respective trading entity of the first trading entity and the second trading entity;

automatically calculate, by the at least one improved matching computer system, in real-time, a second financial compensation to each trading entity whose limit order crossed with the at least portion of the third limit order;

automatically re-calculate, in real-time, based at least in part on the cross with the third limit order, by the at least one improved matching computer system, the decline ratio of each trading entity whose limit order crossed or is not crossed with the at least portion of the third limit order; and automatically cancel, by the at least one improved matching computer system, in real-time, an uncrossed portion of the third limit order.

2. The non-transitory computer readable medium of claim 1, further comprising instructions that, when executed by a processor in a first computing device of a plurality of computing devices, direct the processor to:
  automatically determine a liquidity quality, by the at least one improved matching computer system, by comparing (1) a number of the orders that have been previously declined or cancelled by each trading entity to (2) a number of orders that have been previously accepted by each trading entity.

3. The non-transitory computer readable medium of claim 1, further comprising instructions that, when executed by a processor in a first computing device of a plurality of computing devices, direct the processor to:

automatically determine a liquidity quality, by the at least one improved matching computer system, by comparing (1) a number of the eligible aggressive IOIs that have been previously declined or cancelled by each trading entity to (2) a number of eligible aggressive IOIs that have been previously accepted by each trading entity.

4. The non-transitory computer readable medium of claim 1, wherein the automatic determination of the first and the second allocations of the aggressive IOI and the third limit order respectively are further based at least in part on a respective submission time for each passive IOI or each limit order respectively.

5. The non-transitory computer readable medium of claim 1, wherein the automatic determination of the first allocation of the aggressive IOI further comprises:
automatically ranking, by the at least one improved matching computer system, each trading entity in a priority allocation order based on the decline ratio of each trading entity.

6. The non-transitory computer readable medium of claim 1, wherein the automatic determination of the second allocation of the third limit order further comprises:
automatically ranking, by the at least one improved matching computer system, each trading entity in a priority allocation order based on the decline ratio of each trading entity.

7. The non-transitory computer readable medium of claim 1, wherein the first and the second financial compensations are rebates based on an accepted portion of the at least portion of the aggressive IOI or the at least one portion of the third limit order respectively.

8. The non-transitory computer readable medium of claim 1, wherein the first and the second financial compensations are price discounts respectively.

9. The non-transitory computer readable medium of claim 1, wherein the automatic determination of the first allocation of the aggressive IOI further comprises:
automatically excluding, from the allocation, each trading entity whose decline ratio exceeds a pre-determined decline ratio value.

10. The non-transitory computer readable medium of claim 1, wherein the determination of the second allocation of the third limit order further comprises:
automatically excluding, from the allocation, each trading entity whose decline ratio exceeds a pre-determined decline ratio value.

11. The non-transitory computer readable medium of claim 1, wherein the decline response identifies that a particular trading entity has ignored a respective notification to cross.

12. The non-transitory computer readable medium of claim 11, wherein the decline response identifies that the particular trading entity has not acted upon the respective notification for over 10 seconds after the receipt.

* * * * *